(12) United States Patent
Malcarne

(10) Patent No.: US 10,757,926 B2
(45) Date of Patent: Sep. 1, 2020

(54) FISHING ROD BUTT AND REEL SEAT ASSEMBLY

(71) Applicant: Winthrop Tackle, Essex, CT (US)

(72) Inventor: Frederick J. Malcarne, Westbrook, CT (US)

(73) Assignee: WINTHROP TACKLE, Essex, CT (US)

( * ) Notice: Subject to any disclaimer, the term of this patent is extended or adjusted under 35 U.S.C. 154(b) by 247 days.

(21) Appl. No.: 15/830,066

(22) Filed: Dec. 4, 2017

(65) Prior Publication Data
US 2019/0166815 A1    Jun. 6, 2019

(51) Int. Cl.
| | |
|---|---|
| *A01K 87/00* | (2006.01) |
| *A01K 87/02* | (2006.01) |
| *A01K 87/08* | (2006.01) |
| *A01K 87/06* | (2006.01) |
| *F16B 39/22* | (2006.01) |

(52) U.S. Cl.
CPC .............. *A01K 87/02* (2013.01); *A01K 87/06* (2013.01); *A01K 87/08* (2013.01); *F16B 39/22* (2013.01)

(58) Field of Classification Search
CPC ......... A01K 87/02; A01K 87/06; A01K 87/08
See application file for complete search history.

(56) References Cited

U.S. PATENT DOCUMENTS

| | | | | | |
|---|---|---|---|---|---|
| 549,292 | A | * | 11/1895 | Kewell | A01K 87/08 43/23 |
| 2,177,433 | A | * | 10/1939 | Hedge | A01K 87/08 43/23 |
| 3,744,173 | A | * | 7/1973 | Puyear | A01K 87/08 43/23 |
| 4,050,179 | A | * | 9/1977 | Johnson | A01K 87/06 43/22 |
| 4,083,141 | A | * | 4/1978 | Shedd | A01K 87/02 43/22 |
| 4,439,945 | A | * | 4/1984 | Chang | A01K 87/06 43/22 |
| 4,637,157 | A | * | 1/1987 | Collins | A01K 87/06 43/22 |
| 4,702,032 | A | * | 10/1987 | Ohmura | A01K 87/06 43/22 |
| 4,726,139 | A | * | 2/1988 | Tokuda | A01K 87/06 43/22 |

(Continued)

*Primary Examiner* — Richard G Davis
(74) *Attorney, Agent, or Firm* — Cantor Colburn LLP

(57) ABSTRACT

A fishing rod butt and reel seat assembly for use with a fishing reel and a rod blank. The fishing rod butt and reel seat assembly generally includes a cylindrical shaped rod having a first open end, a second open end, and a main length extending between the first and second open ends. The main length includes a handle section and a real seat section, wherein the handle section has a first outer diameter and the reel seat section has a second outer diameter, wherein the first outer diameter is greater than the second outer diameter thereby forming a shoulder at a transition between the handle section and reel seat section. The handle section includes a plurality of grooves longitudinally extending and equally spaced about a circumference of at least a portion of the handle section. The reel seat section includes retaining means for securing a fishing reel therein.

17 Claims, 4 Drawing Sheets

(56) References Cited

U.S. PATENT DOCUMENTS

| | | | | |
|---|---|---|---|---|
| 5,115,591 | A * | 5/1992 | Oyama | A01K 87/08 43/22 |
| D335,525 | S * | 5/1993 | Chapman | D22/142 |
| 6,125,572 | A * | 10/2000 | Collins | A01K 87/00 43/20 |
| 6,381,898 | B1 * | 5/2002 | Lee | A01K 87/06 43/22 |
| 7,159,355 | B2 * | 1/2007 | Muroi | A01K 87/06 43/22 |
| 8,919,031 | B2 | 12/2014 | Malcarne | |
| 9,807,988 | B2 * | 11/2017 | Westerfield | A01K 87/06 |
| 9,832,981 | B2 * | 12/2017 | Omura | A01K 87/06 |
| 2006/0096153 | A1 * | 5/2006 | Jung | A01K 87/02 43/18.1 R |
| 2006/0288630 | A1 * | 12/2006 | Lin | A01K 87/06 43/22 |

\* cited by examiner

FISHING ROD BUTT AND REEL SEAT ASSEMBLY

BACKGROUND

The present disclosure generally relates to fishing rods and more particularly, to a fishing rod butt and reel seat assembly for a fishing rod.

Conventional deep sea sport fishing rods are made of three primary sections, the rod blank, the handle or butt, and the reel seat. Typically, the rod blank is an elongate member and has one end that is intended to be fitted within the butt. The reel seat is commonly secured directly to the butt rather than to the fishing rod itself. The distal end of the butt can be in the form of a gimbal having intersecting notches, which enables the butt to be received within a socket permanently, but movably, mounted on a boat, a "fighting chair" on a boat or even on a "fighting belt" secured to a fisherman. In the sport of game fishing, strong forces are often encountered, which are transmitted through the rod to the butt assembly.

BRIEF SUMMARY

Disclosed herein a fishing rod butt and reel seat assembly for use with a fishing reel and a rod blank.

In one or more embodiments, the fishing butt and reel seat assembly includes a rigid, one piece cylindrical shaped rod having a first open end, a second open end, and a main length extending between the first and second open ends, the main length including a handle section and a real seat section, wherein the handle section includes a plurality of grooves longitudinally extending and equally spaced about a circumference of at least a portion of the handle section.

In one or more embodiments, the fishing butt and reel seat assembly includes a rigid, one piece cylindrical shaped rod having a first end, a second end, and a main length extending between the first and second ends, the main length including a handle section and a real seat section, wherein the handle section has a first outer diameter and the reel seat section has a second outer diameter, wherein the first outer diameter is greater than the second outer diameter thereby forming a shoulder at a transition between the handle section and reel seat section, wherein the real seat section includes a non-threaded portion extending from the shoulder and an externally threaded portion extending from the non-threaded portion to the second end, wherein the non-threaded portion includes a planar region extending from the shoulder and having raised edges relative to a radial curvature of the non-threaded portion, and wherein the second end is configured to receive a fishing rod blank; a first annular hood including an outwardly facing slot configured to slideably engage the planar region and fixedly and non-rotatably position the first annular hood on the non-threaded portion, and an inwardly facing slot configured to receive a first leg of a fishing reel, wherein the first annular hood abuts the shoulder during use; a second annular hood including an inwardly facing slot configured to receive a second leg of the fishing reel; and at least one locking nut threaded onto the externally threaded portion and configured to effect snug engagement of the first and second annular hoods against the first and second legs of the fishing reel when assembled, wherein the fishing reel is fixedly and non-rotatably positioned on the one piece cylindrical shaped rod.

In one or more embodiments, the fishing butt and reel seat assembly includes a rigid, one piece cylindrical shaped rod having a first end, a second end, and a main length extending between the first and second ends, the main length including a handle section and a real seat section, wherein the handle section has a first outer diameter and the reel seat section has a second outer diameter, wherein the first outer diameter is greater than the second outer diameter thereby forming a shoulder at a transition between the handle section and reel seat section, wherein the handle section includes a plurality of grooves longitudinally extending and equally spaced about a circumference of at least a portion of the handle section; and wherein the real seat section includes a non-threaded portion extending from the shoulder and an externally threaded portion extending from the non-threaded portion to the second end, wherein the non-threaded portion includes a planar region extending from the shoulder and having raised edges relative to a radial curvature of the non-threaded portion, and wherein the second end is configured to receive a fishing rod blank; a first annular hood including an outwardly facing slot configured to slideably engage the planar region and fixedly position the first annular hood on the non-threaded portion, and an inwardly facing slot configured to receive a first leg of a fishing reel, wherein the first annular hood abuts the shoulder during use; a second annular hood including an inwardly facing slot configured to receive a second leg of the fishing reel; and at least one locking nut threaded onto the externally threaded portion and configured to effect snug engagement of the first and second annular hoods against the first and second legs of the fishing reel when assembled.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present invention. It is important, therefore, that the claims be regarded as including such equivalent constructions insofar as they do not depart from the spirit and scope of the present invention.

Other advantages and capabilities of the invention will become apparent from the following description taken in conjunction with the examples showing aspects of the present invention.

BRIEF DESCRIPTION OF THE SEVERAL VIEWS OF THE DRAWINGS

Referring now to the figures wherein the like elements are numbered alike.

DETAILED DESCRIPTION

Figure 1:
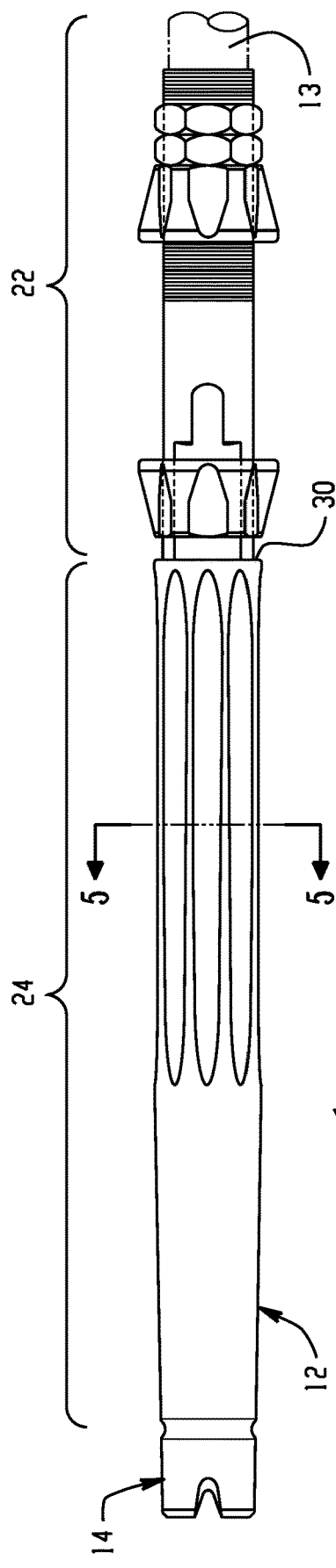
FIG. 1 illustrates a top down perspective view of a fishing rod butt end and reel seat assembly for a fishing rod in accordance with one or more embodiments of the present invention.
Figure 2:
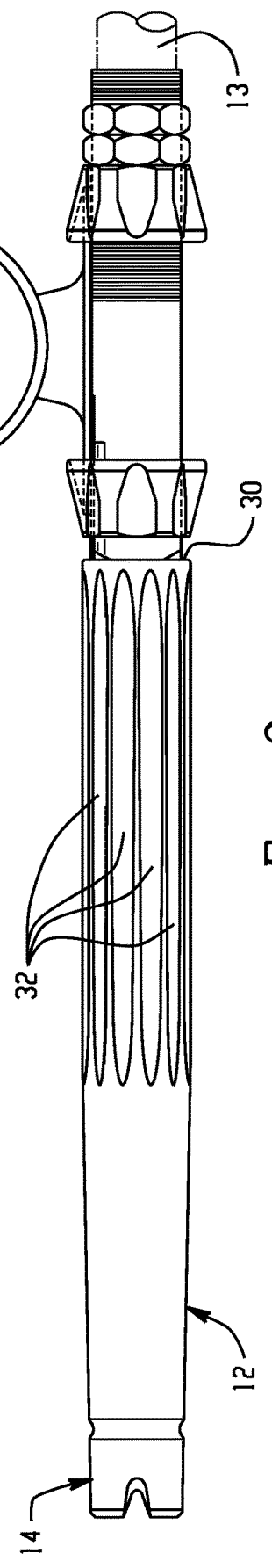
FIG. 2 illustrates a side perspective view of the fishing rod butt and reel seat assembly of FIG. 1 including a fishing reel mounted thereon in accordance with one or more embodiments of the present invention.

Disclosed herein is a fishing rod butt end and reel seat assembly for a fishing rod. Turning now to FIGS. 1-2, there is depicted perspective views of the fishing rod butt end and reel seat assembly, generally indicated by reference numeral 10 in accordance with one or more embodiments, for use with a fishing reel 11 (see FIG. 2) and a fishing rod blank 13, which is partially shown. The butt and reel seat assembly 10 generally includes a shank portion 12 and a gimbal 14, wherein the gimbal 14 is fixedly attached at one end to the shank portion 12 upon assembly of the fishing rod. A rod blank 13 is fixedly attached to the other end of the butt and reel seat assembly 10. The shank portion 12 includes an elongate rigid and generally cylindrically shaped rod, which has an open first end for received the gimbal portion 14, an open second end for receiving the rod blank 13, and a main length extending between the first and second open ends. The elongate rigid and generally cylindrically shaped rod has a generally circular cross section. In one or more embodiments, the interior of the shank portion 12 is hollow, in open communication with the first and second open ends, respectively, and has a substantially constant inner diameter to accommodate the insertion of the gimbal portion 14 into the first open end and the fishing rod blank 13 into the second open end as shown. Optionally, a portion of the hollow interior surface at about one or both open ends can include grooves (not shown) to increase the surface area therein for application of an adhesive that may be used to secure the gimbal and/or the fishing rod blank 13 to the shank portion 12 upon assembly and use of the butt 10 for fishing. The shank portion 12 is formed of a high strength material, such as stainless steel, although in some embodiments, a high strength but substantially lightweight material such as aluminum or anodized aluminum can be used. Other alloys including combinations of materials can be employed and are contemplated.

The main length of the shank portion 12 includes a reel seat section 22 for retaining a fishing reel 11 and a handle section 24. The handle section 24 has a first outer diameter and the reel seat section 22 has a second outer diameter, wherein the first outer diameter is greater than the second outer diameter, thereby forming a shoulder 30 at the transition between the handle section 24 and reel seat section 22.

The handle section 24 generally has a length dimension greater than the reel seat section 22 and further includes a surface defined by a plurality of longitudinal grooves 32 equally spaced apart and extending about the circumference of the handle section 24. The grooves 32 are generally dimensioned to have a hemispherical cross section and provide greater surface area in which an end user can grip the fishing rod butt end and reel seat assembly during use thereof. The depth of the grooves 32 is not intended to be limited, and in one or more embodiments, is generally equal to the difference between the first and second outer diameters of the handle section 24 and the reel seat section 22. The width of the grooves 32 from apex to apex can be in a range from about ⅛th of an inch to about ¾th of an inch. The number of grooves 32 extending about the circumference of the handle section 24 is not intended to be limited, and in one or more embodiments, can generally range from 4 to 12 grooves for a 1 inch outer diameter handle section 24. In one or more other embodiments, the number of grooves 32 range from 4 to 12 for a 1 inch outer diameter handle section 24, and in still one or more other embodiments, the number of grooves is 8 for a 1 inch outer diameter handle section 24. The longitudinal grooves 32 can extend along a portion of the handle section 24 as shown or the handle section 24 in its entirety.

Figure 5:
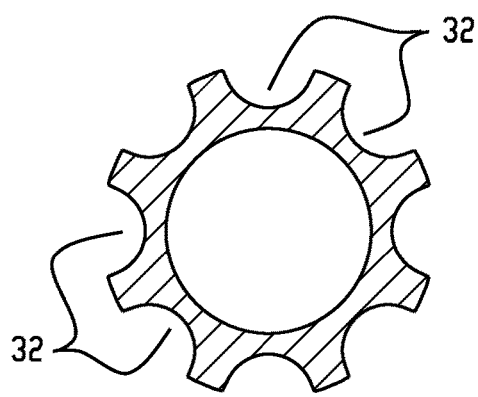
FIG. 5 is a sectional view of the handle section taken along lines 5-5 of FIG. 1 in accordance with one or more embodiments of the present invention.

FIG. 5 provides a sectional view of the handle section 24 taken along lines 5-5 of FIG. 1 showing eight grooves 32 about a perimeter of the handle section 24.

Figure 3:
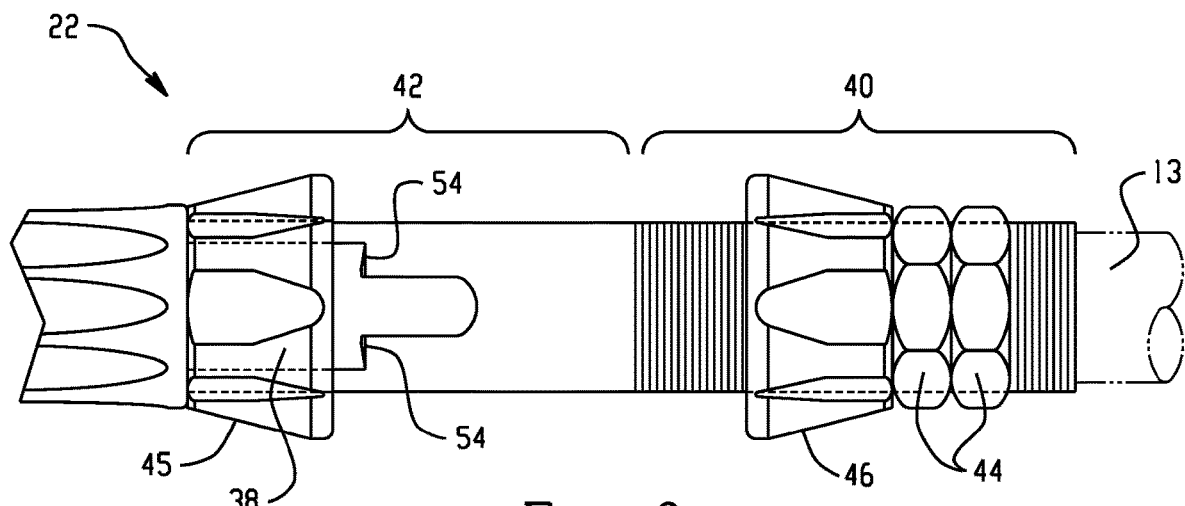
FIG. 3 is an enlarged top down perspective view of the real seat assembly of FIG. 1 in accordance with one or more embodiments of the present invention.
Figure 4:
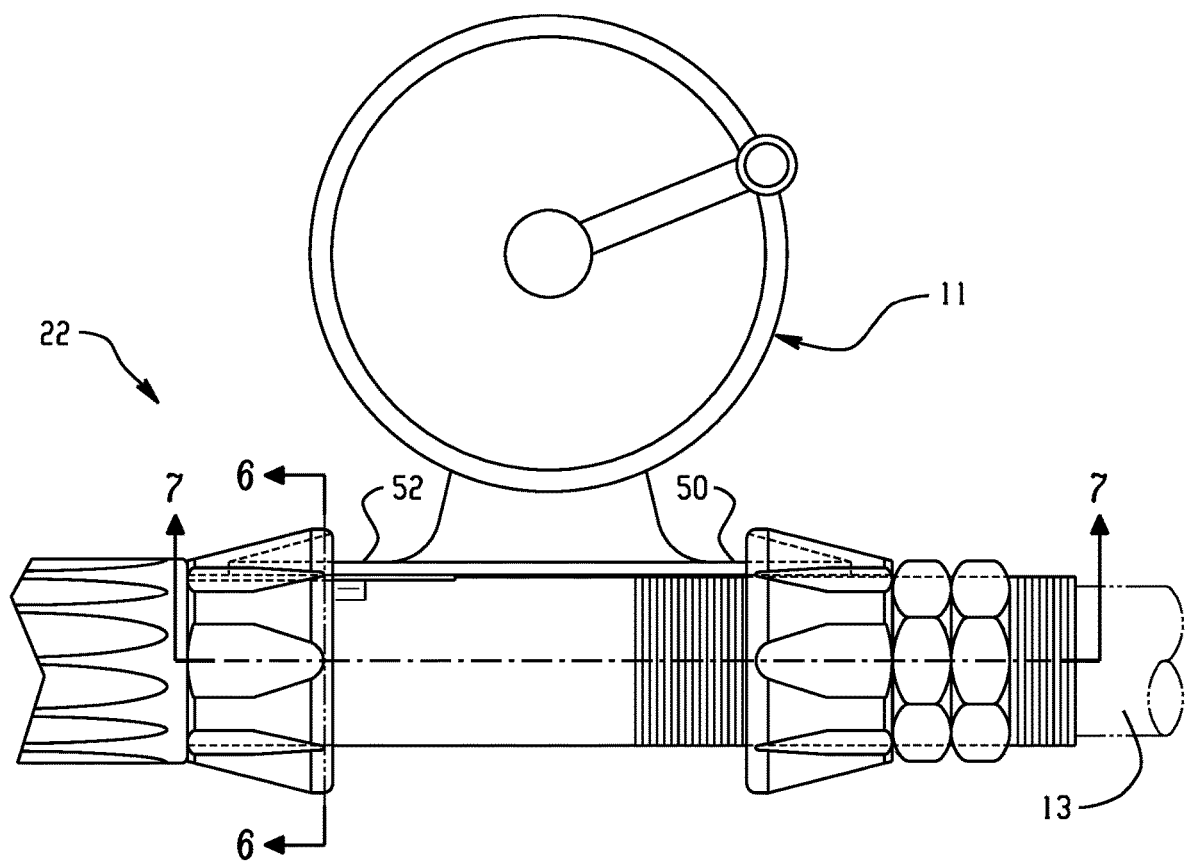
FIG. 4 is an enlarged side perspective view of the real seat assembly of FIG. 1 including a fishing reel mounted in accordance with one or more embodiments of the present invention.

Turning now to the enlarged top and side perspective views of FIGS. 3 and 4, respectively, the reel seat section 22 on the shank portion 12 generally includes a threaded seat portion 40 at a distal end of the shank portion 12 and a non-threaded seat portion 42 abutting the handle section 24. The non-threaded seat portion 42 abuts the shoulder 30 provided at the transition between the handle section 24 and the reel seat section 22 of the shank portion 12 and includes a planar region 38 (shown more clearly in FIG. 3, wherein the top surface thereof is substantially flat). The planar region includes edges 54 that are raised relative to the radial curvature of the non-threaded seat portion 42. The reel 11, when mounted within the reel seat section 22, includes two legs 50, 52, one of which will be seated onto the planar region 38. The real seat section 22 further includes first and second annular hoods 45, 46 and at least one locking nut 44, two of which are shown. The annular hoods 45, 46 have inner diameters that permit the annular hoods to slide downwardly onto the reel seat section 22 generally stopping at the edges 54 of the planar region 38.

Figure 6:
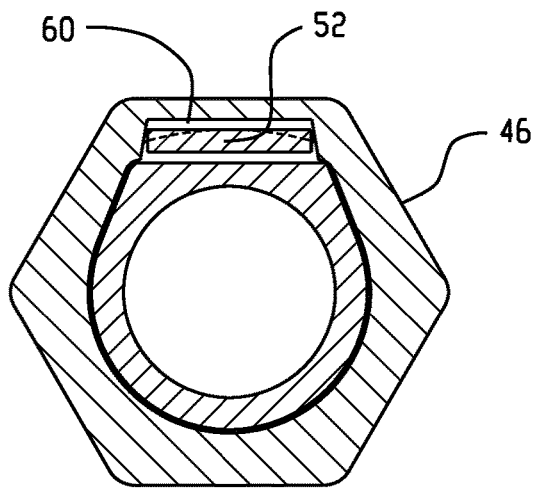
FIG. 6 is a sectional view of the reel seat section taken along lines 6-6 of FIG. 4 in accordance with one or more embodiments of the present invention.
Figure 7:
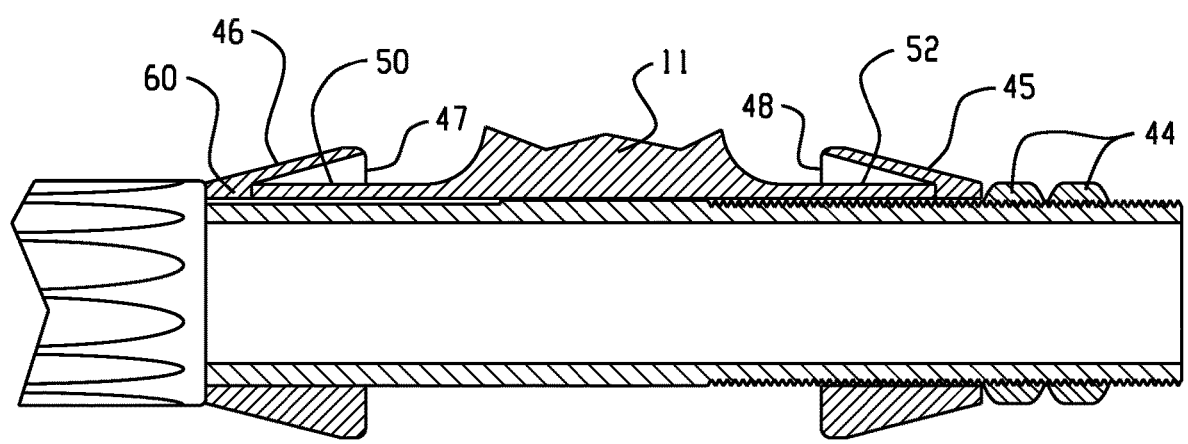
FIG. 7 is a sectional view of the reel seat section taken along lines 7-7 of FIG. 4 in accordance with one or more embodiments of the present invention.
Figure 8:
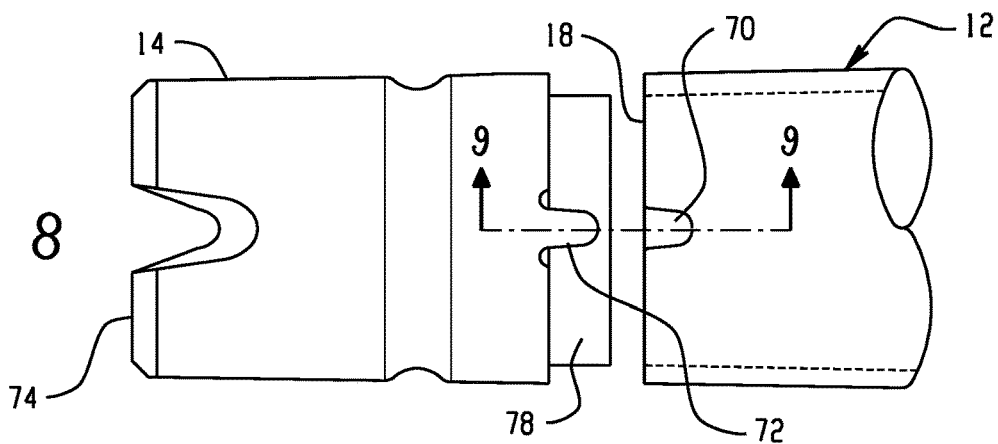
FIG. 8 is an exploded perspective view of an exemplary gimbal and an end portion of the shank portion of the fishing rod butt end and reel seat assembly in accordance with one or more embodiments of the present invention.
Figure 9:
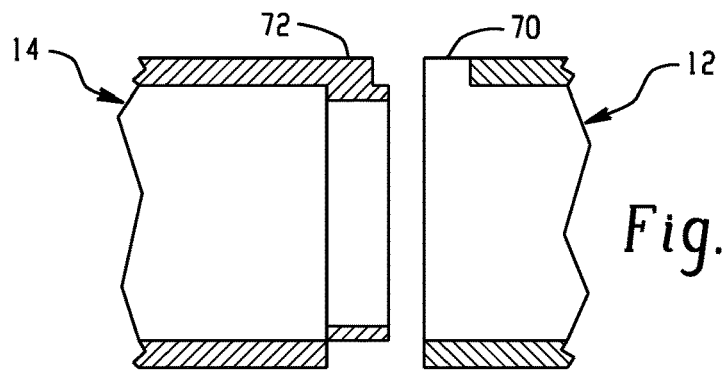
FIG. 9 is an exploded sectional view of the exemplary gimbal and the end portion of the shank portion taken along lines 9-9 of FIG. 8 in accordance with one or more embodiments of the present invention.
Figure 10:
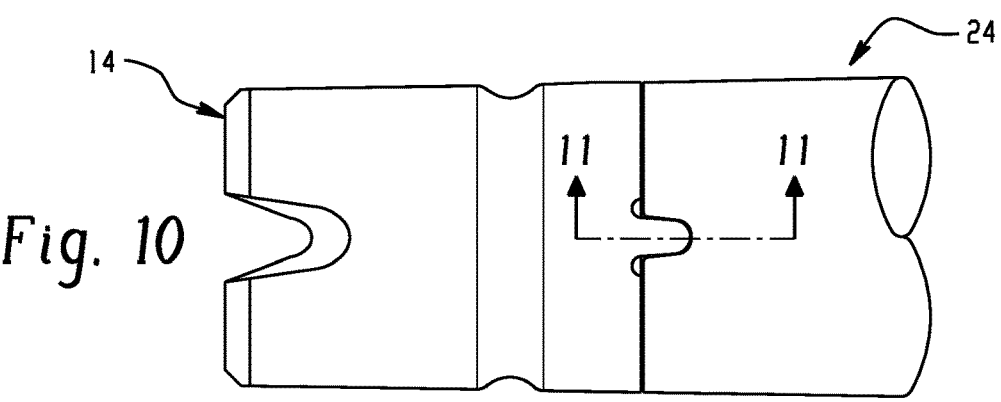
FIG. 10 is a perspective view of the exemplary gimbal and the end portion of the shank portion as assembled in accordance with one or more embodiments of the present invention.
Figure 11:
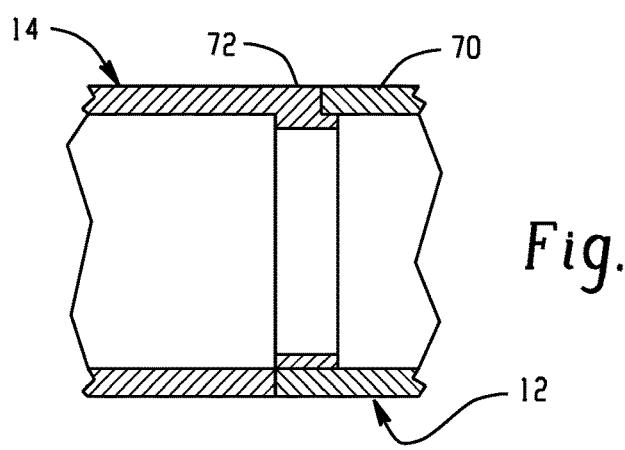
FIG. 11 is a sectional view of the exemplary gimbal and the end portion of the shank portion as assembled taken along lines 11-11 of FIG. 10 in accordance with one or more embodiments of the present invention.

As shown more clearly in FIG. 7, each annular hood 45, 46 is formed of a one-piece cylindrical ring that includes inward facing slots 47, 48, respectively, configured to receive a leg 50, 52 of a conventional fishing reel 11. Annular hood 46 further includes an outward facing slot 60 as shown more clearly in FIG. 6, which is designed to slideably engage the raised edges 54 of the planar region 38 and permit annular hood 46 to slide in abutment to the shoulder 30. Annular hood 46 when seated on the reel section 22 in this manner aligns the reel 11 when assembled onto the real seat section 22. In this manner, the first annular hood 46, also referred to as the lower annular hood, and slot 47 therein for receiving a reel leg will be at a fixed rotational position, i.e., rotatably locked when in abutting engagement with the planar region 38, thereby securing the fishing reel 11 to a fixed orientation on the shank portion 12. Once secured in this manner, the reel 11 cannot rotate about the shank portion 12 during use and instead is advantageously at a fixed position and orientation. The engagement of the annular hood 46 with the raised edges of the planar region 38 will prevent rotation of the annular hood, which in turn will prevent rotation of the reel 11 once the reel legs 50, 52 are seated within annular hoods 45, 46 and locking nut 44 provide snug engagement thereof. Moreover, leg 50 once seated within the inwardly facing slot 47 will contact the flat planar region 38 when the reel is secured within the hoods 45, 46, which will further resist rotational forces during use.

The second annular hood 45 is slidably mounted onto the threaded reel seat portion 40 and is slid downwardly where it may slide as well as rotate freely until a fishing reel 11 is received thereon, whereupon it will function as an upper annular hood. In order to position a fishing reel on the reel seat portion 22, one leg 50 of the fishing reel 11 is placed in a slot 47 of the first annular hood 46 and the other leg 52 of the fishing reel 11 is placed in a slot 48 of the second annular hood 45. The second annular hood 45 is moveable along the longitudinal axis of the reel seat section 22 to permit adjustment to seat variously sized fishing reels. At this point, at least one of the locking nuts 44 is mounted onto threaded portion 46 and is threaded in the same downwardly direction to effect snug engagement of the upper annular hood 42 against the legs 50, 52 of the reel 11. In one or more embodiments, given that the vibration from the boat or even a generator thereon might loosen the lock nut, a second lock nut 44 can also be mounted onto reel seat section 22 and threaded in the same downwardly direction into snug engagement with first lock nut so as to prevent all movement thereof and to securely maintain the fishing reel on the reel seat portion even during the application of enormous stress while being utilized in deep sea fishing.

In one or more embodiments as shown more clearly in FIGS. 8-11, the handle section 24 further includes a notch 70, at about the first open end. The notch 70 is shaped to receive a complementary shaped tab 72 formed on an outer surface of the gimbal portion 14. Upon insertion of the gimbal portion 14 into the first open end, the notch 70 and tab 72 are aligned to lock the gimbal portion 14 in a specific orientation along with the reel 11. The intersecting notches 74 provided on a distal end surface of the gimbal portion 14 are configured to locate a pin (not shown) used in a gimbal nock, which may be located in a fighting chair, fighting harness, or boat. Typically, the intersecting notches 74 form a cross-hatch pattern. The gimbal and gimbal nock (not shown) relationship prevents twisting and turning of the assembled fishing rod during a fight or while using the fishing rod for trolling. The outer diameter of the gimbal 14 is such that the outer surface is flush relative to the outer surface of the handle section 24 of the shank portion 12. The gimbal portion 14 includes a sleeve portion 78 that is inserted into the open end of the handle section 24.

During assembly, the sleeve portion 78 will be press fit into the first open end 18 to secure the gimbal portion 14 to the shank portion 12. Optionally, an adhesive agent such as an epoxy can be used to affix the gimbal portion 14 to the shank portion 12. In one or more embodiments where an adhesive agent is used, the sleeve portion 78 can include grooves to increase the surface area thereof. Once the adhesive agent is applied to the shank portion 12 of the assembly, the gimbal 14 can be inserted or press fit into the open end 18 of the shank portion 12 to define the rod end, so as to provide a finished device that is substantially strong and able to withstand the large bending forces, loads, and otherwise heavy duty use to which it will be subjected during deep sea fishing.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fishing butt and reel seat assembly designed for use with a fishing reel and a fishing rod blank, the fishing butt and reel seat assembly comprising:
    a rigid, one piece cylindrical shaped rod having a first open end, a second open end, and a main length extending between the first and second open ends, the main length including a handle section and a reel seat section, wherein the first open end is configured to receive a gimbal and the second open end is configured to receive a rod, wherein the handle section includes a plurality of fixedly arranged grooves longitudinally extending about a shank portion from the reel seat assembly towards first open end and are equally spaced about a circumference of at least a portion of the handle section.

2. The fishing butt and reel seat assembly of claim 1, wherein the plurality of grooves longitudinally extend about the circumference of the handle section in its entirety.

3. The fishing butt and reel seat assembly of claim 1, wherein each one of the plurality of grooves have a hemispherical cross-section.

4. The fishing butt and reel seat assembly of claim 1, wherein the plurality of grooves have a width from apex to apex in a range from about $1/8^{th}$ of an inch to about $3/4^{th}$ of an inch.

5. The fishing butt and reel seat assembly of claim 1, wherein the plurality of grooves range from 4 to 12 grooves about the circumference of the handle section.

6. The fishing butt and reel seat assembly of claim 1, wherein the first open end is configured to receive a gimbal, the gimbal including a terminal end having a notched shape configured to engage a gimbal nock when in use; a cylindrical sleeve extending from the terminal end including a raised tab thereon and having a diameter effective to slidably fit within the first open end, wherein the handle section include includes a notch at the first open end for receiving the tab when the cylindrical sleeve is inserted into the first open end.

7. A fishing butt and reel seat assembly designed for use with a fishing reel and a fishing rod blank, the fishing butt and reel seat assembly comprising:
    a rigid, one piece cylindrical shaped rod having a first end, a second end, and a main length extending between the first and second ends, the main length including a handle section and a reel seat section, wherein the handle section has a first outer diameter and the reel seat section has a second outer diameter, wherein the first outer diameter is greater than the second outer diameter thereby forming a shoulder at a transition between the handle section and reel seat section, wherein the reel seat section comprises:
    a non-threaded portion extending from the shoulder and an externally threaded portion extending from the non-threaded portion to the second end, wherein the non-threaded portion includes a single planar region extending from the shoulder and having raised edges relative to a non-planar portion of the non-threaded portion, and wherein the second end is configured to receive a fishing rod blank;

a first annular hood including an outwardly facing slot configured to slideably engage the planar region and fixedly and non-rotatably position the first annular hood on the non-threaded portion, and an inwardly facing slot configured to receive a first leg of a fishing reel, wherein the first annular hood abuts the shoulder during use;

a second annular hood including an inwardly facing slot configured to receive a second leg of the fishing reel; and at least one locking nut threaded onto the externally threaded portion and configured to effect snug engagement of the first and second annular hoods against the first and second legs of the fishing reel when assembled, wherein the fishing reel is fixedly and non-rotatably positioned on the one-piece cylindrical shaped rod.

8. The fishing butt and reel seat assembly of claim 7, wherein the one-piece cylindrical shaped rod, the first and second annular hoods, and the at least one locking nuts comprise stainless steel, aluminum, and combinations thereof.

9. The fishing butt and reel seat assembly of claim 7, further comprising a gimbal attached to the first open end.

10. The fishing butt and reel seat assembly of claim 9, wherein the gimbal comprises a cylindrical sleeve that is press fit into the second end.

11. The fishing butt and reel seat assembly of claim 9, wherein the gimbal comprises a cylindrical sleeve that is inserted and adhesively secured in the second end.

12. The fishing butt and reel seat assembly of claim 11, wherein the cylindrical sleeve includes one or more grooves in a channel so as to increase a surface area.

13. The fishing butt and reel seat assembly of claim 7, wherein the handle section includes a plurality of grooves longitudinally extending and equally spaced about a circumference of at least a portion of the handle section.

14. The fishing butt and reel seat assembly of claim 13, wherein the plurality of grooves range from 4 to 12 grooves about the circumference of the handle section.

15. The fishing butt and reel seat assembly of claim 13, wherein each one of the plurality of grooves have a hemispherical cross-section.

16. The fishing butt and reel seat assembly of claim 7, wherein the first end is configured to receive a gimbal, the gimbal including a terminal end having a notched shape configured to engage a gimbal nock when in use; a cylindrical sleeve extending from the terminal end including a raised tab thereon, wherein the first end includes a notch for receiving the tab when the cylindrical sleeve is inserted into an opening in the first end so as to fixedly position the gimbal within the first end.

17. A fishing butt and reel seat assembly designed for use with a fishing reel and a fishing rod blank, the fishing butt and reel seat assembly comprising:

a rigid, one piece cylindrical shaped rod having a first end, a second end, and a main length extending between the first and second ends, the main length including a handle section and a reel seat section, wherein the handle section has a first outer diameter and the reel seat section has a second outer diameter, wherein the first outer diameter is greater than the second outer diameter thereby forming a shoulder at a transition between the handle section and reel seat section, wherein the handle section comprises a plurality of grooves longitudinally extending and equally spaced about a circumference of at least a portion of the handle section; and wherein the reel seat section comprises:

a non-threaded portion extending from the shoulder and an externally threaded portion extending from the non-threaded portion to the second end, wherein the non-threaded portion includes a single planar region extending from the shoulder and having raised edges relative to a radial curvature of the non-threaded portion, and wherein the second end is configured to receive a fishing rod blank;

a first annular hood including an outwardly facing slot configured to slideably engage the planar region and fixedly position the first annular hood on the non-threaded portion, and an inwardly facing slot configured to receive a first leg of a fishing reel, wherein the first annular hood abuts the shoulder during use;

a second annular hood including an inwardly facing slot configured to receive a second leg of the fishing reel; and at least one locking nut threaded onto the externally threaded portion and configured to effect snug engagement of the first and second annular hoods against the first and second legs of the fishing reel when assembled, wherein the fishing reel is fixedly and non-rotatably positioned on the one-piece cylindrical shaped rod.

\* \* \* \* \*